US012778143B2

(12) United States Patent
Melchionda et al.

(10) Patent No.: US 12,778,143 B2
(45) Date of Patent: Nov. 3, 2026

(54) APPARATUS FOR MAKING FILLED PASTA

(71) Applicant: AZIONARIA COSTRUZIONI MACCHINE AUTOMATICHE A.C.M.A. S.P.A., Bologna (IT)

(72) Inventors: Maria Livia Melchionda, Bologna (IT); Domenico Polidori, Bologna (IT); Riccardo Ruggeri, Bologna (IT)

(73) Assignee: Azionaria Costruzioni Macchine Automatiche A.C.M.A. S.p.A., Bologna (IT)

(*) Notice: Subject to any disclaimer, the term of this patent is extended or adjusted under 35 U.S.C. 154(b) by 750 days.

(21) Appl. No.: 18/252,578

(22) PCT Filed: Nov. 10, 2021

(86) PCT No.: PCT/IB2021/060409

§ 371 (c)(1),
(2) Date: May 11, 2023

(87) PCT Pub. No.: WO2022/101802

PCT Pub. Date: May 19, 2022

(65) Prior Publication Data

US 2024/0016164 A1 Jan. 18, 2024

(30) Foreign Application Priority Data

Nov. 13, 2020 (IT) ........................ 102020000027278

(51) Int. Cl.
*A21C 9/06* (2006.01)
*A21C 9/08* (2006.01)

(52) U.S. Cl.
CPC ................ *A21C 9/063* (2013.01); *A21C 9/08* (2013.01)

(58) Field of Classification Search
CPC ........... A21C 9/063; A21C 9/08; A21C 9/066; A21C 9/06
See application file for complete search history.

(56) References Cited

U.S. PATENT DOCUMENTS

2003/0066432 A1 4/2003 Arango
2015/0366222 A1* 12/2015 Bertuzzi ................ A21C 9/066 99/450.7

FOREIGN PATENT DOCUMENTS

EP 1736055 A2 12/2006
EP 3097784 A1 11/2016
(Continued)

OTHER PUBLICATIONS

International Seach Report and Written Opinion dated Mar. 21, 2022 from counterpart International Patent Application No. PCT/IB2021/060409.

*Primary Examiner* — Eronica Martin
(74) *Attorney, Agent, or Firm* — SHUTTLEWORTH & INGERSOLL, PLC; Timothy J. Klima

(57) ABSTRACT

Machine for making filled pasta including a feeding station, configured for feeding a layer of fresh pasta and a predetermined quantity of a semi-finished food product to a coupling space of said machine, and a coupling device configured for coupling the layer of fresh pasta and the predetermined quantity of semi-finished food product. The coupling device includes at least one pair of synchronised forming rollers configured to rotate, respectively, on a first and a second rotation shaft and defining between the m the coupling space. Moreover, the coupling device is configured for performing, at each rotation cycle of said forming rollers, the production of an element of filled pasta by progressively wrapping said layer of fresh pasta around the predetermined quantity of semi-finished food product. The coupling device is configured to rotate the forming rollers at a variable speed,
(Continued)

between a maximum speed and a minimum speed, during a single rotation cycle.

15 Claims, 4 Drawing Sheets

(56) References Cited

FOREIGN PATENT DOCUMENTS

| | | | |
|---|---|---|---|
| GB | 2162457 | A | 2/1986 |
| IT | 1232457 | B | 2/1992 |
| IT | MI20090429 | A1 | 9/2010 |
| IT | MI20100347 | A1 | 9/2011 |
| WO | 2020170281 | A1 | 8/2020 |

* cited by examiner

Fig.5
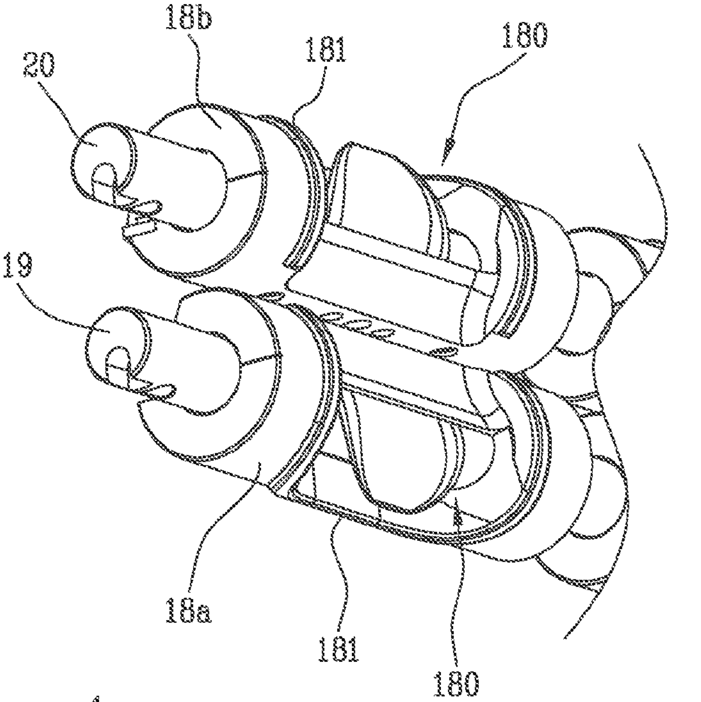
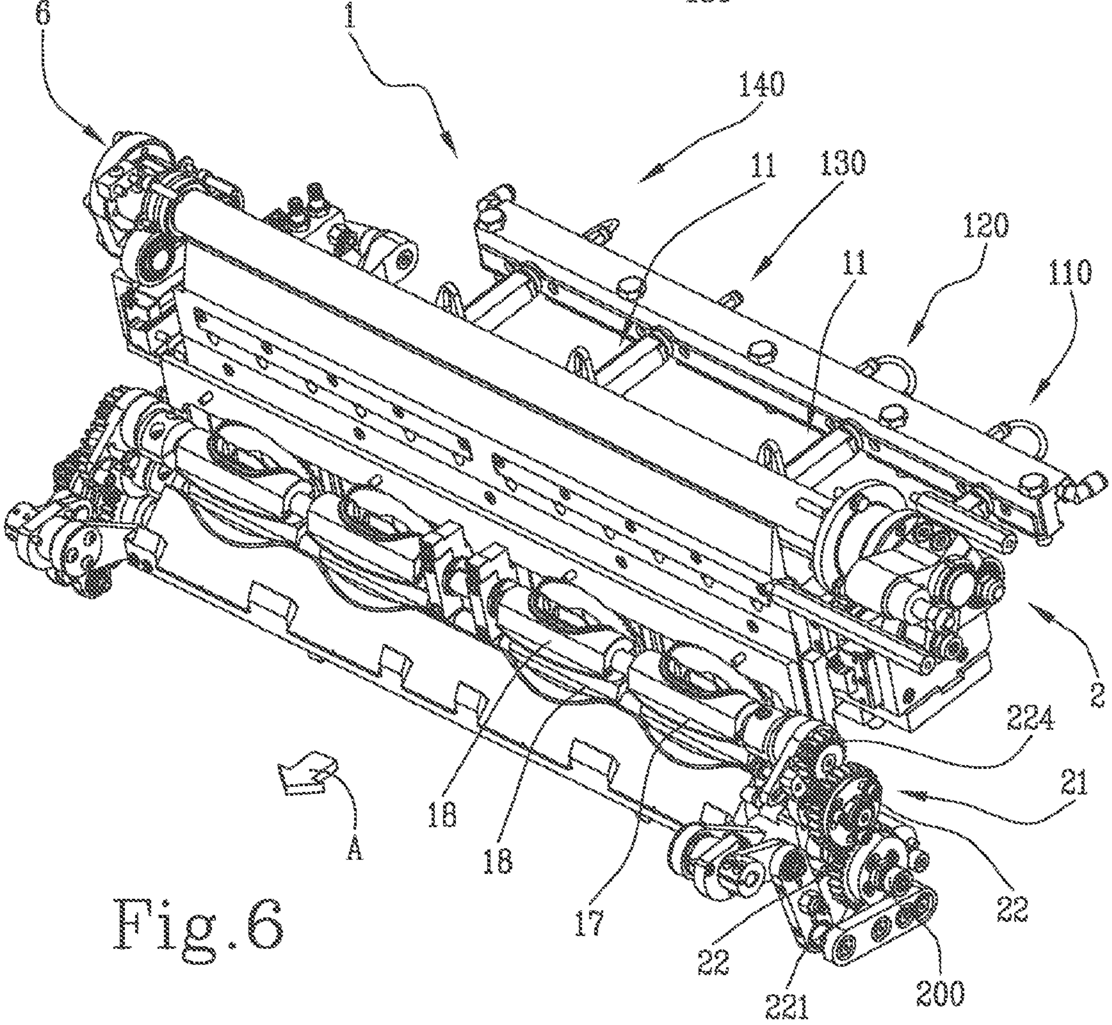
Fig.6

APPARATUS FOR MAKING FILLED PASTA

This application is the National Phase of International Application PCT/IB2021/060409 filed Nov. 10, 2021 which designated the U.S.

This application claims priority to Italian Patent Application No. 102020000027278 filed Nov. 13, 2020, which applications are incorporated by reference herein.

TECHNICAL FIELD

This invention relates to a machine and a method for making filled pasta.

The expression "filled pasta" means a type of food product having one or more layers of pasta between which is enclosed a food filling, for example meat, fish, vegetable, cheese or a combination of these.

BACKGROUND ART

In accordance with the current state of the art, the machines for making filled pasta have a feeding station configured for feeding a predetermined quantity of fresh pasta and a predetermined quantity of filling to a filling station in which the filling is wrapped in the pasta to form individual elements of filled pasta.

The fresh pasta is usually fed by intermittently conveying a continuous strip of fresh pasta towards a station for cutting pieces of fresh pasta intended to be filled with a portion of filling. The filling is fed to the filling station by a feeder device configured to portion the quantity of filling for each cut of fresh pasta.

The feeder device for feeding the generally filling comprises a duct, forming a feed cylinder, comprising an inlet for receiving the filling, and an outlet leading to the filling station, substantially at the cut of fresh pasta.

In particular, these feeder devices can comprise an actuator, for example pneumatic, with a piston or rod inserted in the feed cylinder for pushing out the individual portions or doses of filling towards the filling station.

Disadvantageously, the filling tends to settle on the feeding device and in particular on the walls of the feeding cylinder forming food deposits which, over time, lose the original organoleptic properties and may contaminate the filled pasta. This also translates into a difficult repeatability of the filling procedure since the portions of filling actually released have a variability due to the build-ups and detachments which are generated cyclically over time.

Moreover, the use of compositions of filling with a semi-liquid or sticky consistency, generally used for making large sizes of filled pasta, results in a frequent need to stop the machine in order to perform the cleaning operations.

In this context, the main technical purpose of the invention is to propose a machine and method for making filled pasta which are free of the above-mentioned drawbacks.

Aim of the Invention

An aim of the invention is to provide a machine and a method for making filled pasta which allow a precise dosing of the filling in the pasta.

Another aim of the invention is to propose a machine and a method for making filled pasta which guarantee freshness of the filling dispensed.

Another aim of the invention is to provide a machine for making filled pasta which has high levels of reliability, in particular does not require regular machine stops for cleaning and maintenance.

The technical purpose indicated and the aims specified are substantially achieved by a machine and a method for making filled pasta, as described in one or more of the accompanying claims.

Further features and advantages are more apparent in the detailed description which follows of a preferred embodiment of a machine and a method for making filled pasta according to the invention.

BRIEF DESCRIPTION OF THE DRAWINGS

This description is made with reference to the accompanying drawings, which are also provided solely for purpose of non-limiting example and in which:

FIG. 5 shows an enlarged detail of a portion of the machine for making filled pasta according to the invention;

FIG. 6 shows a perspective view of the machine for making filled pasta according to the invention;

Figure 1:
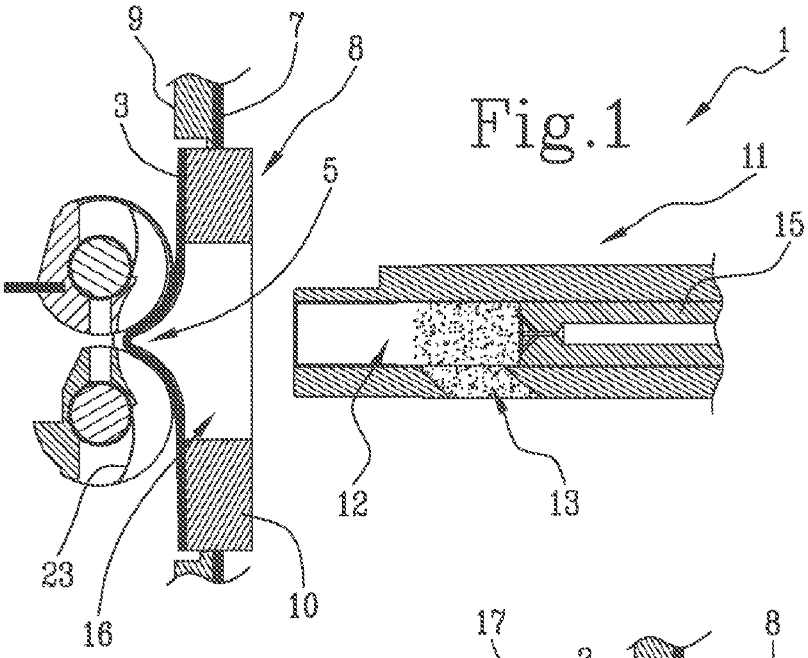
FIGS. 1 to 4 illustrate a sequence of different operating conditions of a machine for making filled pasta according to the invention.

With reference to the accompanying drawings, the numeral 1 denotes in its entirety a machine for making filled pasta according to the invention.

DETAILED DESCRIPTION OF PREFERRED EMBODIMENTS OF THE INVENTION

The machine 1 comprises a feeding station 2 configured for feeding a layer of fresh pasta 3 and a predetermined quantity of a semi-finished food product 4 to a coupling space 5 of the machine 1.

Preferably, the feeding station 2 comprises a feeder device 6 and a splitting device 8.

In particular, the feeder device 6 is configured to feed a continuous strip 7 of fresh pasta to the splitting device 8 and comprises a plurality of counter-rotating rollers configured for conveying the continuous strip 7 of fresh pasta to the splitting device 8. The counter-rotating rollers are designed to impart a predetermined thickness to the continuous strip 7 of fresh pasta.

The splitting device 8 cuts and/or punches the continuous strip 7 of fresh pasta to obtain a layer of fresh pasta 3 with a desired outline to obtain a single element of fresh filled pasta.

Figure 2:
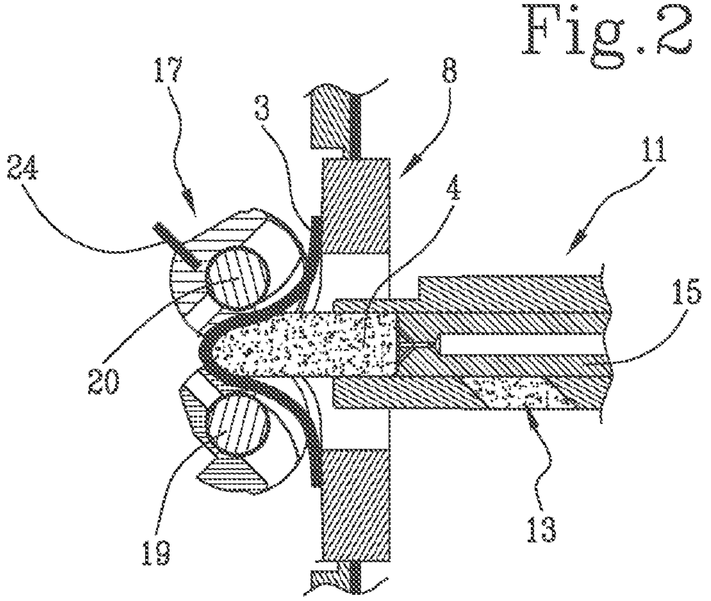

According to a possible embodiment and as illustrated in the accompanying drawings, the splitting device 8 comprises a cutting punch 10 acting in conjunction with a fixed contact element 9. In particular, the cutting punch 10 can be reversibly inserted in the fixed contact element 9, with respect to which it has the same shape, for splitting the continuous strip 7 of fresh pasta, preferably by punching. Preferably, as shown in FIG. 2, the cutting punch 10 is movable in an alternating direction towards and away from the coupling space 5.

The feeding station 2 also comprises feeding means configured for feeding a predetermined quantity of semi-finished food product 4 to the coupling space 5 of the machine 1.

Preferably, the feeding means are made in the form of an extruder 11 comprising a feed duct 12, having an inlet 13 and an outlet 14 for the semi-finished food product, and a pusher 15 reversibly movable inside the feed duct 12 for moving the semi-finished food product from the inlet 13 to the outlet 14.

The outlet 14 of the feed duct 12 is positioned facing the coupling space 5 in such a way that the semi-finished food product is dispensed directly to the coupling space 5.

According to a possible embodiment and as illustrated in the accompanying drawings, the cutting punch 10 has a through opening 16 designed to house, or defining, a portion of the feed duct 12.

Moreover, the feed duct 12 is also preferably movable away from and towards the coupling space 5 in a regulated manner as a function of the operating position adopted by the cutting punch 10.

The machine 1 also comprises a coupling device 17 defining the above-mentioned coupling space 5 and configured for coupling the layer of fresh pasta 3 and the predetermined quantity of semifinished food product 4.

According to the embodiment illustrated, the coupling device 17 comprises at least one pair of synchronised forming rollers 18 designed to rotate, respectively, on a first and a second rotation shaft 19, 20 parallel to each other.

In particular, the coupling device 17 is configured for rotating the forming rollers 18 in a counter-rotating fashion and, preferably, in such a way that the forming rollers 18 rotate instantaneously at the same angular speed.

In more detail, the coupling device 17 is configured for performing, at each rotation cycle of the forming rollers 18, the production of an element of filled pasta by progressively wrapping the layer of fresh pasta 3 around the semi-finished food product 4.

The forming rollers 18 are designed for folding the layer of fresh pasta 3, cut by the cutting punch 10 and the fixed contact element 9, superposing two opposite flaps 3*a*, 3*b* and allowing the interposing between the above-mentioned flaps 3*a*, 3*b* of a predetermined quantity of semi-finished food product 4.

As illustrated in FIGS. 1 to 4 and 8, the forming rollers 18 define between them at least a part of the coupling space 5.

For this purpose, the forming rollers 18 preferably have a recess 180 defining at least partly the coupling space 5.

In particular, the forming rollers 18, rotating synchronously (that is to say, at the same angular and, also, tangential speed), position the respective recesses 180, forming part of the coupling space 5 in which the layer of fresh pasta 3 and the predetermined quantity of semi-finished food product 4 are coupled.

Figure 9:
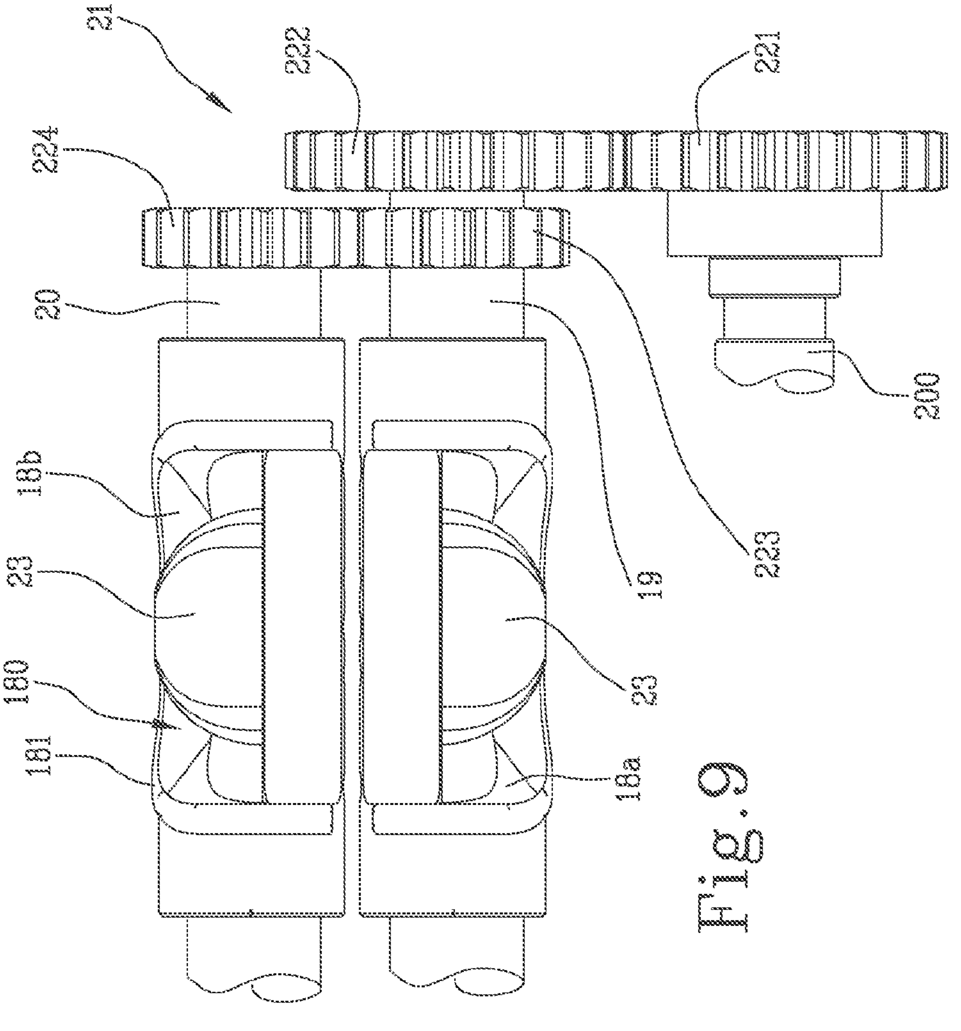
FIG. 9 shows a side view of a detail of the machine of FIG. 6.

As illustrated in FIGS. 5 and 9, the forming rollers 18 may have a shaped outer border 181, preferably perimetric to the recess 180 and in particular in the shape of a "C" or "U", configured to close the layer of fresh pasta 3 containing the semi-finished food product 4 superposing it and compressing it by means of a concentrated pressure of two opposite flaps 3*a*, 3*b* around the semi-finished food product 4. In this way, a rear and at least partly lateral closure of the filling element is formed, in the shape of a "C" or "U".

At least one of the above-mentioned forming rollers 18 can be equipped with a compacting element 23, preferably positioned inside the recess 180, configured for progressively deforming the layer of fresh pasta 3 during the rotation of the forming rollers 18 and for compacting the semi-finished food product 4 inside the layer of fresh pasta 3.

The compacting element 23 can be reversibly moved, during a rotation cycle of the forming rollers 18, between an engagement position in which it acts on the layer of fresh pasta 3 promoting a filling and a disengaged condition in which it does not act on the layer of fresh pasta 3.

In this way, the compacting element 23 applies a force in an axial direction (that is to say, in the direction of expulsion of the filled pasta element) on the semi-finished food product 4 through the layer of fresh pasta 3 which favours a detachment from the extruder 11 limiting the settlement close to the outlet 14. This action also promotes pushing of the filling towards a front portion of the layer of pasta 3 which has already been closed laterally (in particular, by the shaped outer border 181). Since the compacting element 23 reaches the coupling space 5 before the rear edge of the shaped outer border 181 during the rotation of the forming rollers 18, the axial pushing action exerted by the compacting element 23 occurs correctly promoting the detachment of the semi-finished food product 4 from the extruder 11 and compacting in the front zone of the filled pasta element being formed.

Preferably, the compacting element 23 may be made in the form of an elastically flexible lamina applied to the forming roller 18, which deforms automatically after entering into contact with a rear portion of the layer of fresh pasta 3.

Moreover, at least one of the forming rollers 18 may be provided with a folding element 24 configured to fold a portion of the layer of fresh pasta 3 in such a way as to give it the final shape of the filled fresh pasta element, for example the shape of a cappelletto or tortellino.

The folding element 24 also acts on the fresh pasta element filling, promoting an escape from the coupling space 5 after obtaining the final shape.

Figure 7:
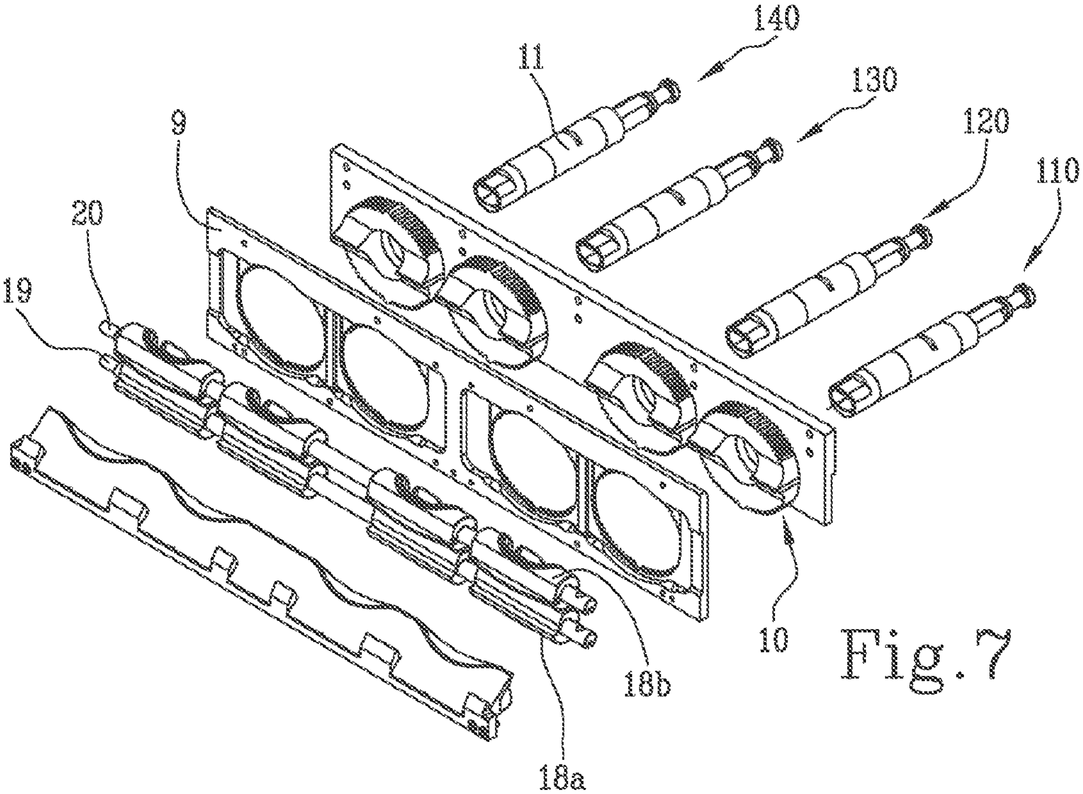
FIG. 7 shows an exploded view of a part of the machine of FIG. 5.
Figure 8:
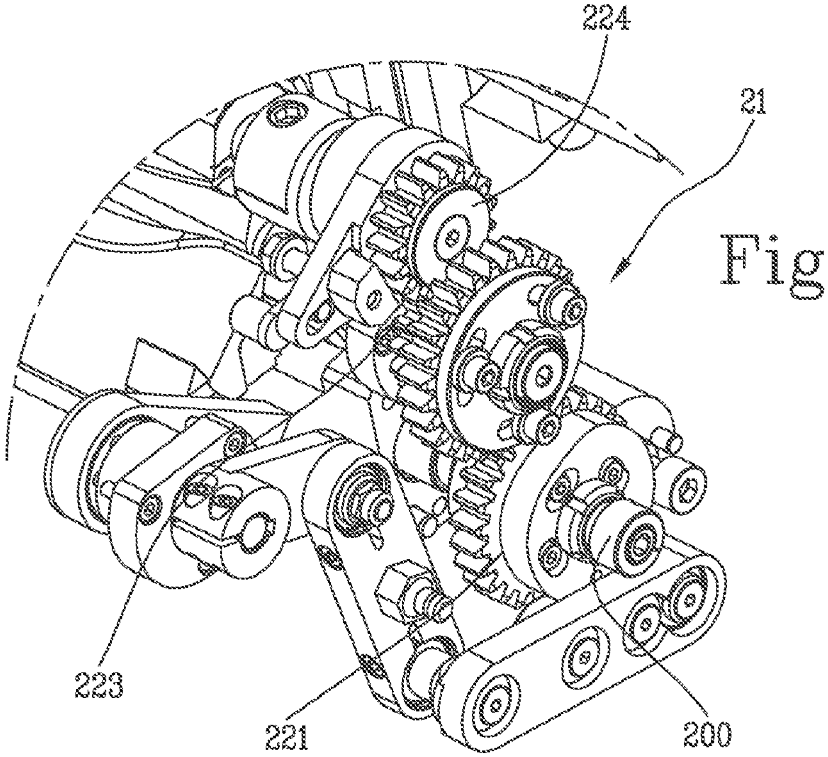
FIG. 8 shows a perspective view of a part of the machine of FIG. 6.

In accordance with the embodiment illustrated in FIGS. 6, 7, the machine comprises four forming units 110, 120, 130, 140 placed side by side along a direction transversal, preferably perpendicular, to the feeding direction "A" of the filled pasta elements and preferably identical to each other. It should be noted that the number of forming units could be different and vary from a single forming unit to a desired number, determined by the requirements and by space limitations.

Each forming unit 110, 120, 130, 140 comprises a feeding station 2 configured for feeding a layer of fresh pasta 3 and a predetermined quantity of a semi-finished food product 4 to the coupling device 17.

According to this configuration, the coupling device 17 comprises a plurality of first forming rollers 18*a* and a plurality of second forming rollers 18*b* respectively mounted on the first and second rotation shaft 19, 20, facing each other and defining pairs of forming rollers 18, each pair associated with a respective forming unit 110, 120, 130, 140.

Advantageously, the coupling device 17 is configured to rotate the forming rollers 18 at a variable speed, between a maximum speed and a minimum speed, during a single rotation cycle. Preferably, a rotation cycle corresponds to 360° rotation of the forming rollers 18.

The speed variation may be performed continuously or, alternatively, according to one or more discrete speed stages.

In particular, the coupling device 17 is designed to rotate the forming rollers 18 at a variable speed in at least one stretch of the complete rotation cycle, for example in the final section of the rotation cycle corresponding to completion of the filled pasta element.

Preferably, the forming rollers 18 adopt an increasing speed at least at an end stretch of the rotation cycle and/or upon completion of the element of filled pasta.

Preferably, the forming rollers 18 adopt the maximum speed at the end stretch of the rotation cycle and/or upon completion of the filled pasta element, in such a way as to favour the expulsion of the filled pasta element at the end of the forming process.

In other words, the forming rollers 18 adopt the maximum speed preferably in the second half, and still more preferably in the last quarter, of the rotation cycle.

Moreover, the coupling device 17 is configured for moving the forming rollers according to a decelerated motion, preferably between the maximum speed and the minimum speed, after reaching the maximum speed, in particular at the start of the subsequent rotation cycle.

According to a possible embodiment, not illustrated, the coupling device 17 comprises a drive unit acting on the first and/or second rotation shaft 19, 20 and controlled in such a way as to move at least a first and/or a second forming roller 18*a*, 18*b* of each pair in accordance with a preset law of motion containing the maximum speed and the minimum speed. In more detail, the two rotation shafts 19, 20 can be synchronised by means of a homokinetic meshed connection with gear wheels driven by a single motor or the two rotation shafts 19, 20 may be disengaged from each other and driven in a controlled fashion by respective motors.

Figure 10:
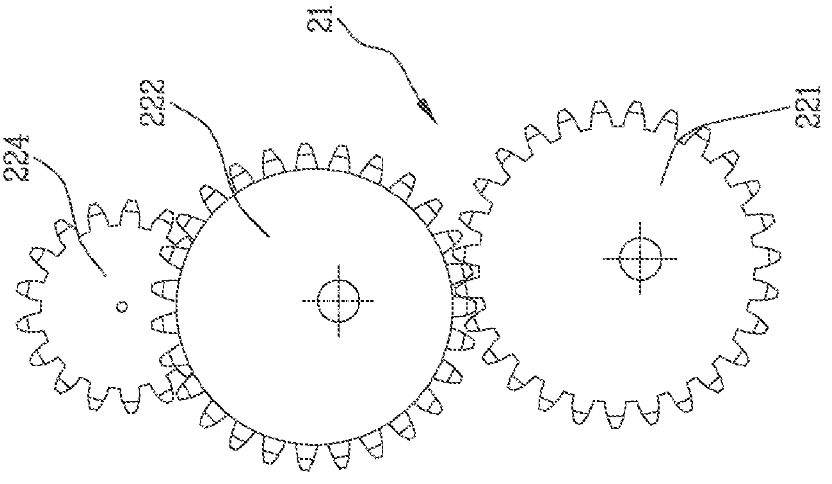
FIG. 10 shows a front view of the detail of FIG. 9.

According to a further possible embodiment and as illustrated in FIGS. 9 and 10, the coupling device 17 comprises a motor unit (not explicitly illustrated) and a mechanical transmission 21 interposed between the motor and the rotation shafts 19, 20 and configured to vary the transmission ratio between motor and rotation shafts 19, 20 within the same rotation cycle to obtain the maximum speed and the minimum speed. In this case, too, the two rotation shafts 19, 20 can be synchronised by means of a homokinetic meshed connection with gear wheels.

In order to perform this variation of the transmission ratio during the rotation cycle, the mechanical transmission 21 comprises at least one pair of gears 22 with a transmission ratio variable within a complete revolution of rotation.

Preferably, the pair of gears 22 is a pair of non-circular gears and/or with eccentric axis of rotation.

According to the embodiment illustrated in FIG. 10, the first gear 221 and the second gear 222 are circular but with an eccentric mounting on the respective rotation shaft 19, 20 and mounted in such a way as to remain constant meshing during the entire rotation cycle. This results in a transmission ratio variable continuously over the entire 360° rotation cycle, in particular with a trend comparable to a sinusoidal trend.

According to a different embodiment not illustrated, the gears 22 may have a non-circular shape, for example elliptical.

The transmission ratio of the above-mentioned pair of gears 22 is variable between a maximum transmission ratio and a minimum transmission ratio.

For example, the maximum transmission ratio is between 1.5 and 4, preferably equal to 2 and the minimum transmission ratio is between 0.25 and 0.8, preferably 0.5.

In particular, the maximum transmission ratio is between 1.5 and 4 and preferably equal to approximately 2 and the minimum transmission ratio is between 0.25 and 0.8 and preferably equal to approximately 0.5.

In use, a continuous strip 7 of fresh pasta is fed by the feeder device 6 to the splitting device 8. The splitting device 8 punches the continuous strip 7 of fresh pasta to obtain the layer of fresh pasta 3 for a single element of filled fresh pasta (FIG. 1). Subsequently, the forming rollers 18 promote the movement of two flaps 3*a*, 3*b*, preferably opposite each other, of the layer of fresh pasta 3 towards each other, in particular lateral flaps and rear flap, forming a containment space designed to contain the semi-finished food product 4 whilst the semi-finished food product 4 is pushed by the extruder 11 towards the layer of fresh pasta 3 filling the above-mentioned containment space (FIG. 2).

In other words, a layer of fresh pasta 3 and a predetermined quantity of a semi-finished food product 4 are fed to a coupling space 5 to make an element of filled pasta, for example cappelletti, tortellini and/or the like, by progressive wrapping the layer of fresh pasta 3 around the semi-finished food product 4.

At the same time as this step, preferably close to the closing of the rear flap (and in particular before the closing), the compacting element 23 intervenes by acting in an axial direction on the respective layer of pasta 3, favouring the feeding of the semi-finished food product 4 and its detachment from the extruder 11.

Preferably, as the two flaps 3*a*, 3*b* of the layer of fresh pasta 3 move towards each other, the forming rollers 18 are accelerated.

The acceleration may be achieved by varying the transmission ratio of the mechanical transmission 21 inside the same rotation cycle of the mechanical transmission to obtain at least a minimum speed and a maximum speed.

Preferably, the variation in speed is performed in such a way as to obtain a maximum speed upon completion of an element of filled pasta.

In particular, the acceleration may be performed continuously and/or according to a plurality of intermediate speed values between the minimum speed and the maximum speed.

Figure 3:
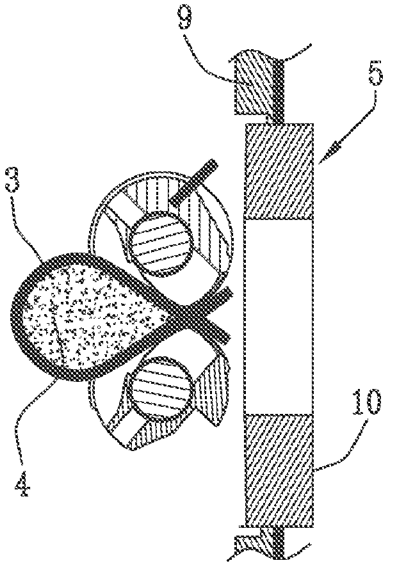

Subsequently, the forming rollers 18 make contact with the two flaps 3*a*, 3*b* of fresh pasta, closing the semi-finished food product 4 in the containment space (FIG. 3).

Advantageously, the variation in speed applied to the layer of pasta 3, for example under the action of the forming rollers, promotes the detachment from the extruder 11 of the semi-finished food product 4.

Figure 4:
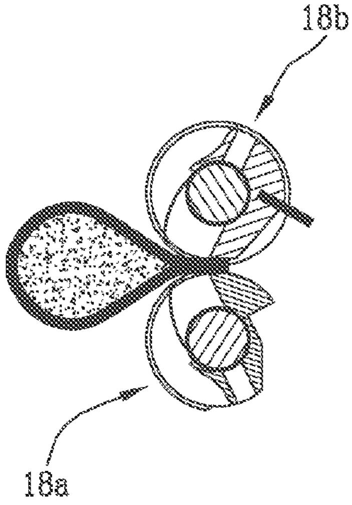

Subsequently, a folding element 24 can act on the layer of fresh pasta 3 to make a fold which gives it the final shape of the fresh filled pasta element and promotes an escape from the coupling space (FIG. 4).

It should be noted, therefore, that the invention achieves the preset aims by providing a machine for making filled pasta and a method for making filled pasta which allow a precise dosing of the filling inside the pasta thanks to a variation of the speed of movement of the layer of fresh pasta and/or the element of filled pasta.

Advantageously, the above-mentioned variation in speed promotes a detachment of the semi-finished food product, limiting the settlement of portions of filling on the feeder device.

In this way, the invention overcomes the need common to prior art machines for frequent stoppages for cleaning and maintenance operations.

The invention claimed is:

1. A machine for making filled pasta comprising:

a feeding station configured for feeding a layer of fresh pasta and a predetermined quantity of a semi-finished food product to a coupling space of said machine;

a coupling device configured to couple said layer of fresh pasta and said predetermined quantity of semi-finished food product;

wherein said coupling device comprises at least one pair of synchronized forming rollers configured to rotate, respectively, on a first rotation shaft and a second rotation shaft; said at least one pair of synchronized forming rollers forming therebetween said coupling space and being configured for producing, at each rotation cycle of said at least one pair of synchronized forming rollers, an element of filled pasta by progressively wrapping said layer of fresh pasta around said predetermined quantity of semi-finished food product;

wherein said coupling device is configured to rotate said at least one pair of synchronized forming rollers at a variable speed, between a maximum speed and a minimum speed, during a single rotation cycle.

2. The machine according to claim 1, wherein said at least one pair of synchronized forming rollers have a shaped outer border and wherein said rotation cycle corresponds to a 360° rotation of said at least one pair of synchronized forming rollers.

3. The machine according to claim 1, wherein said coupling device comprises a motor unit acting on at least one chosen from said first rotation shaft and said second rotation shaft and controlled to move said at least one chosen from said first rotation shaft and said second rotation shaft according to a preset motion path containing said maximum speed and said minimum speed.

4. The machine according to claim 1, wherein said coupling device comprises a motor unit and a mechanical transmission interposed between the motor unit and said at least one chosen from first rotation shaft and said second rotation shaft, said mechanical transmission being configured to vary a relative transmission ratio within a same rotation cycle to obtain said maximum speed and said minimum speed.

5. The machine according to claim 4, wherein said mechanical transmission comprises at least one pair of gears with a variable transmission ratio within one complete rotation, including a pair of non-circular gears and/or with an eccentric axis of rotation.

6. The machine according to claim 4, wherein said variable transmission ratio is variable between a maximum transmission ratio and a minimum transmission ratio, said maximum transmission ratio being between 1.5 and 4 and said minimum transmission ratio being between 0.25 and 0.8.

7. The machine according to claim 6, wherein said maximum transmission ratio is approximately 2 and said minimum transmission ratio is approximately 0.5.

8. The machine according to claim 1, wherein said coupling device is configured to rotate said at least one pair of synchronized forming rollers with the variable speed variable continuously during the single rotation cycle.

9. The machine according to claim 1, wherein said at least one pair of synchronized forming rollers adopt said maximum speed at an end stretch of the rotation cycle and/or upon completion of the element of filled pasta, and/or wherein the variable speed of said at least one pair of synchronized forming rollers is increasing at least at said end stretch of the rotation cycle and/or upon completion of the element of filled pasta.

10. The machine according to claim 1, wherein at least one forming roller of said at least one pair of synchronized forming rollers includes a compacting element configured for progressively deforming said layer of fresh pasta during a rotation of said at least one pair of synchronized forming rollers and for compacting said predetermined quantity of semi-finished food product inside said layer of fresh pasta; said compacting element including a plate elastically flexible in a radial direction applied to said at least one forming roller.

11. A method for making filled pasta comprising:

feeding a layer of fresh pasta to a coupling space;

feeding a predetermined quantity of a semi-finished food product to the coupling space;

progressively wrapping said layer of fresh pasta around the predetermined quantity of semi-finished food product in the coupling space whilst the layer of fresh pasta and the predetermined quantity of semi-finished food product are fed through said coupling space;

closing the layer of fresh pasta around the predetermined quantity of semi-finished food product;

accelerating the layer of fresh pasta and the predetermined quantity of semi-finished food product away from the coupling space at least during said step of closing the layer of fresh pasta around the predetermined quantity of semi-finished food product.

12. The method according to claim 11, wherein said step of accelerating the layer of fresh pasta and the predetermined quantity of semi-finished food product away from the coupling space is performed continuously between a minimum speed and a maximum speed.

13. The method according to claim 11, wherein said step of accelerating the layer of fresh pasta and the predetermined quantity of semi-finished food product away from the coupling space is performed to reach a maximum speed at a completion of an element of filled pasta.

14. The method according to claim 11, and further comprising a step of compacting said predetermined quantity of semi-finished food product inside said layer of fresh pasta, by applying a predetermined pressure to the layer of fresh pasta, said step of compacting being carried out close to said step of closing the layer of fresh pasta around the predetermined quantity of semi-finished food product.

15. The method according to claim 11, wherein said step of progressively wrapping the layer of fresh pasta around the predetermined quantity of semi-finished food product in the coupling space is performed using a pair of forming rollers counter-rotating in a synchronous fashion, said step of accelerating the layer of fresh pasta and the predetermined quantity of semi-finished food product away from the coupling space being actuated by angular acceleration of said pair of forming rollers.

* * * * *